(12) United States Patent
Tsai et al.

(10) Patent No.: US 12,551,122 B2
(45) Date of Patent: Feb. 17, 2026

(54) APPARATUS AND METHOD FOR HEART RATE MEASUREMENT

(71) Applicant: Artilux, Inc., Menlo Park, CA (US)

(72) Inventors: Jui-Wei Tsai, Hsinchu County (TW); Kai-Wei Chiu, Hsinchu County (TW); Chih-Wei Yeh, Hsinchu County (TW)

(73) Assignee: Artilux, Inc., Menlo Park, CA (US)

( * ) Notice: Subject to any disclaimer, the term of this patent is extended or adjusted under 35 U.S.C. 154(b) by 84 days.

(21) Appl. No.: 18/456,488

(22) Filed: Aug. 26, 2023

(65) Prior Publication Data

US 2024/0148262 A1    May 9, 2024

Related U.S. Application Data

(60) Provisional application No. 63/382,112, filed on Nov. 3, 2022.

(51) Int. Cl.
*A61B 5/024* (2006.01)
*A61B 5/00* (2006.01)

(52) U.S. Cl.
CPC ........ *A61B 5/02416* (2013.01); *A61B 5/7221* (2013.01)

(58) Field of Classification Search
None
See application file for complete search history.

(56) References Cited

U.S. PATENT DOCUMENTS

| | | |
|---|---|---|
| 2017/0128020 A1 | 5/2017 | Olivier et al. |
| 2019/0192079 A1 | 6/2019 | Groenendaal et al. |
| 2020/0178821 A1 | 6/2020 | Wu et al. |
| 2021/0093211 A1* | 4/2021 | Gbati I .............. A61B 5/02108 |
| 2022/0192515 A1 | 6/2022 | Yeo et al. |
| 2023/0010538 A1* | 1/2023 | Klamkin ............... G01S 7/4813 |
| 2023/0081794 A1* | 3/2023 | Mäkinen ............... A61B 5/681 |
| | | 356/614 |
| 2023/0107454 A1* | 4/2023 | Similä ................... A61B 5/681 |
| | | 600/479 |
| 2023/0397847 A1* | 12/2023 | Wengarten .......... A61B 5/0075 |
| 2024/0049970 A1* | 2/2024 | Matsumura ........ A61B 5/02108 |
| 2024/0081696 A1* | 3/2024 | De Benedetto .... A61B 5/14552 |

* cited by examiner

*Primary Examiner* — Patricia J Park
(74) *Attorney, Agent, or Firm* — Dority & Manning, P.A.

(57) ABSTRACT

Apparatuses and methods for calculating heart rate are disclosed herein. The apparatus can include a processor configured to calculate heart rate information. The processor includes a heart rate calculator including a memory configured to store a PPG signal and a calculation element coupled to the memory and configured to calculate a heart rate value and generate at least one quality checking factor according to the PPG signal. The processor also includes a checking element configured to determine a validity indicator according to the at least one quality checking factor, a memory control element coupled to the memory and configured to access the memory to transmit the PPG signal, and a multiplexer configured to output the PPG signal accessed by the memory control element or the heart rate value calculated by the calculation element according to the validity indicator.

19 Claims, 8 Drawing Sheets

APPARATUS AND METHOD FOR HEART RATE MEASUREMENT

CROSS-REFERENCE TO RELATED APPLICATIONS

This patent application claims priority to U.S. Provisional Patent Application No. 63/382,112, filed Nov. 3, 2022, the contents of which are incorporated herein by reference in their entirety.

FIELD

The present application is related to a heart rate measurement apparatus. In particular, the heart rate measurement

BACKGROUND

Optical sensors are being used in many systems, such as smartphones, wearable electronics, robotics, and autonomous vehicles, etc. for proximity detection, 2D/3D imaging, object recognition, image enhancement, material recognition, color fusion, health monitoring, and other relevant applications.

SUMMARY OF THE INVENTION

The present disclosure discloses an electronic device having an optical sensing apparatus, where the electronic device can calculate the heart rate by a processor, thereby the bioinformation from the heart rate can be continuously monitored with low power consumption. The optical sensing apparatus can be operable for different wavelength ranges, including visible (e.g., wavelength range 380 nm to 780 nm, or a similar wavelength range as defined by a particular application) and non-visible light. The non-visible light includes near-infrared (NIR, e.g., wavelength range from 780 nm to 1400 nm, or a similar wavelength range as defined by a particular application) and short-wavelength infrared (SWIR, e.g., wavelength range from 1400 nm to 3000 nm, or a similar wavelength range as defined by a particular application) light.

One aspect of the present disclosure is directed to an apparatus comprising a processor configured to calculate heart rate information. The processor includes a heart rate calculator including a memory configured to store a PPG signal and a calculation element coupled to the memory and configured to calculate a heart rate value and generate at least one quality checking factor according to the PPG signal. The processor also includes a checking element configured to determine a validity indicator according to the at least one quality checking factor, a memory control element coupled to the memory and configured to access the memory to transmit the PPG signal, and a multiplexer configured to output the PPG signal accessed by the memory control element or the heart rate value calculated by the calculation element according to the validity indicator.

In some implementations, the calculation element includes an analysis circuit configured to calculate the heart rate value by detecting peaks of the PPG signal and calculating an interval between peaks.

In some implementations, the calculation element includes a matched filter configured to determine a quality index representing the at least one quality checking factor.

In some implementations, the quality index is determined by calculating a mean absolute value of the PPG signal.

In some implementations, the calculation element includes a DC subtraction element configured to receive the PPG signal and to output an AC signal having a DC value removed from the PPG signal and a band-pass filter configured to receive the AC signal and to output a band-passed signal having out-of-band signals removed from the AC signal.

In some implementations, the processor includes a skin detector configured to detect the presence of an object's skin.

In some implementations, the processor includes a controller configured to operate the skin detector and the heart rate calculator in an interleaving manner.

In some implementations, the apparatus includes a light receiver including one or more photodetectors and a control device comprising the processor.

In some implementations, the one or more photodetectors are formed on a first substrate wafer-bonded to the control device formed on a second substrate.

In some implementations, a bonding interface exists between the one or more photodetectors and the processor.

In some implementations, the one or more photodetectors are stacked on the control device.

In some implementations, the processor includes a controller configured to control the light receiver.

In some implementations, the one or more photodetectors include a plurality of sensing areas deposited on a substrate, the plurality of sensing areas being composed of a material different from the substrate.

In some implementations, the memory control element is configured to output the PPG signal in a first-in-first-out (FIFO) configuration.

Another aspect of the present disclosure is directed to a method of heart rate calculation performed by an apparatus comprising a processor. The method includes obtaining a PPG signal from a light receiver arranged in the apparatus, calculating, by a calculation element arranged in the processor, a heart rate value according to the PPG signal, and generating, by the calculation element, at least one quality checking factor to a checking element arranged in the processor. The method also includes providing, by the checking element, a validity indicator based on the at least one quality checking factor, and determining whether to output the heart rate value based on the validity indicator.

In some implementations, the method includes determining whether to output the PPG signal based on the validity indicator.

In some implementations, the method includes detecting peaks of the PPG signal and calculating the interval between peaks to calculate the heart rate value.

In some implementations, the method includes obtaining a mean absolute value by a matched filter to generate a quality index to be the at least one quality checking factor.

In some implementations, the method includes storing the PPG signal in a memory.

In some implementations, the heart rate value is obtained every one computation cycle of the PPG signal.

BRIEF DESCRIPTION OF THE DRAWINGS

The foregoing aspects and many of the advantages of this application will become more readily appreciated as the same becomes better understood by reference to the following detailed description, when taken in conjunction with the accompanying drawings.

DETAILED DESCRIPTION

Figure 1:
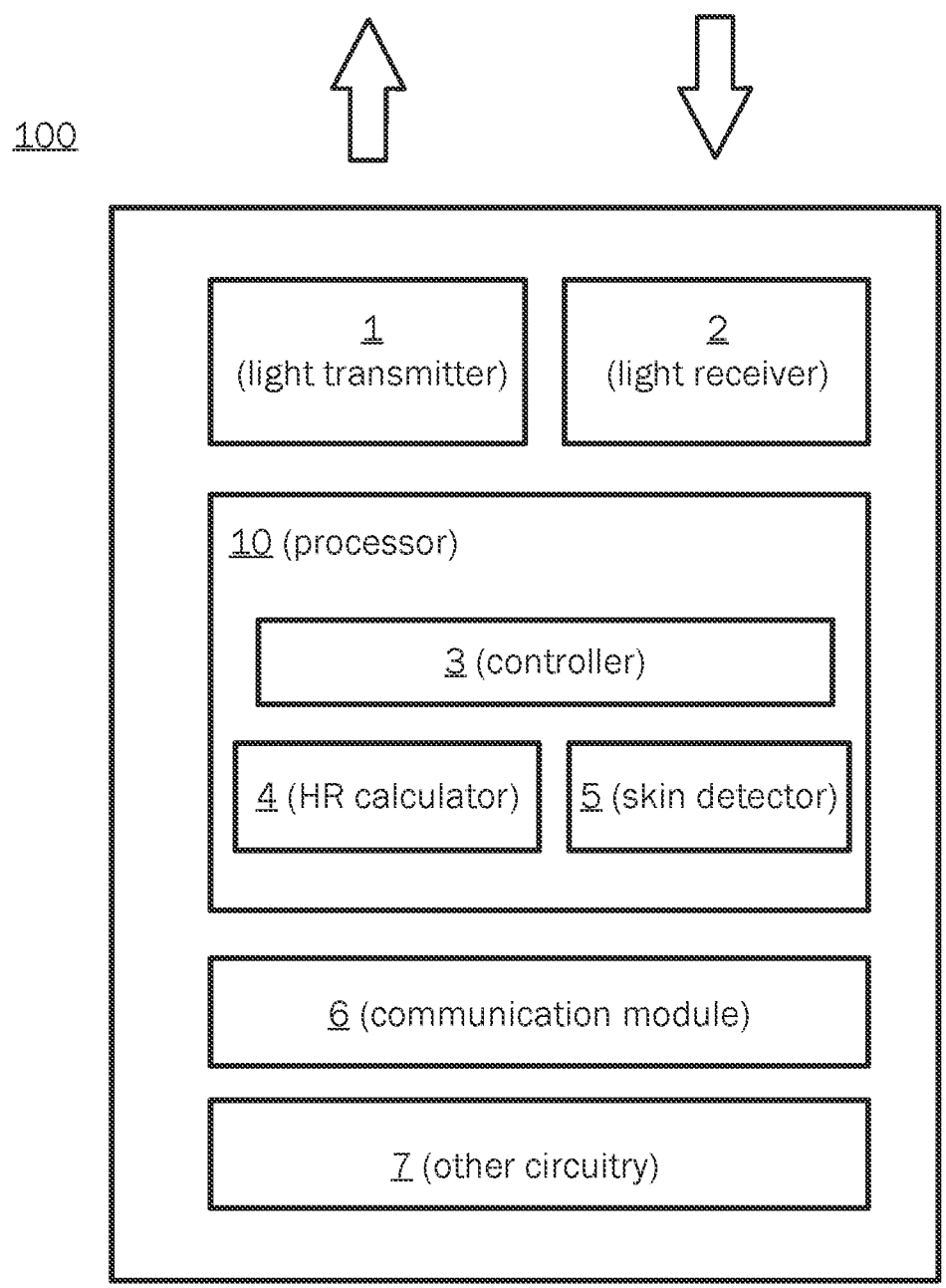
FIG. 1 illustrates a block diagram of an optical sensing apparatus in accordance with one embodiment of the present disclosure.

The following embodiments accompany the drawings to illustrate the concept of the present disclosure. In the drawings or descriptions, similar or identical parts use the same reference numerals, and in the drawings, the shape, thickness, or height of the element can be reasonably expanded or reduced. The embodiments listed in the present application are only used to illustrate the present application and are not used to limit the scope of the present application. Any obvious modification or change made to the present application does not depart from the spirit and scope of the present application.

In general, wearable electronic devices (e.g., earbuds, AR/VR wearable equipment, wristband, etc.) can be worn on a user for various activities, such as playing music, exercise, athletic training, rest, daily life activities, physical therapy, etc. The electronic device with a personal health monitor function can provide users with bioinformation during activities. For example, a photoplethysmogram (PPG) is an optically obtained plethysmogram, which can be used to determine various bioinformation such as heart rate, calories, skin moisture, blood oxygen level ($SpO_2$), and/or blood pressure, etc. In some cases, the bioinformation is calculated by the software of the electronic device, which consumes a lot of power during the calculation, so that the electronic device cannot be used for a long time without charging. In addition, the speed of software calculation may be slower than that of hardware calculation, and the calculation process by software may potentially slow down other software running on the electronic device. Thus, the electronic device that can provide accurate bioinformation and reduce power consumption is still an important issue. In this way, the user can wear the electronic device for a long time without frequent charging. Moreover, this disclosure describes an optical sensing apparatus that can either calculate heart rates using hardware or software depending on the quality of the PPG signal, which can provide more reliable measurements based on different operating conditions.

FIG. 1 illustrates a block diagram of an optical sensing apparatus 100 in accordance with one embodiment of the present disclosure. The optical sensing apparatus 100 can be located in an electronic device (not shown) which can be a wearable device or a portable device. The wearable device can be an earbud, a wristband, a wristwatch, a pair of glasses, a helmet, a head-mounted device, or other wearable electronic device. The portable device can be a cellular telephone, tablet computer, laptop computer, computer mouse, computer stylus, or other accessories. The optical sensing apparatus 100 includes a light transmitter 1, a light receiver 2, a processor 10, a communication module 6, and other circuitries 7.

The light transmitter 1 can include one or more light sources which can emit light with the same wavelength or different wavelengths for object detection, bioinformation measurement, and/or indication. In an embodiment, the light transmitter 1 may include a first light source that can emit a NIR light and a second light source that can emit a SWIR light. In another embodiment, multiple light sources can emit SWIR lights. Light transmitted by the light transmitter 1 may be absorbed and/or reflected by an object that is in proximity to the electronic device (not shown). The light receiver 2 is configured to detect the reflected light from the object that is in proximity to the electronic device. The light receiver 2 may include one or more photodetectors to receive light corresponding to the lights emitted from the light transmitter 1 for object detection and/or bioinformation measurement. The bioinformation measurement can be calculated by the processor 10 according to the PPG signal received from the light receiver 2. In some embodiments, one or more photodetectors of the light receiver 2 may include a photodetector for three-dimensional (3D) depth sensing (e.g., i-TOF or d-TOF photodetector), proximity sensing, optical spectroscopy, two-dimensional (2D) sensing (e.g., 2D IR imaging), or a combination thereof. Each of the photodetectors can be implemented using a single photodetector or an array of photodetector pixels (e.g., 1D or 2D photodetector array as described in reference to FIGS. 6 and 7).

The processor 10 can be implemented by digital processor (DSP), general purpose processor, application-specific integrated circuit (ASIC), digital circuitry, or any combinations thereof. The processor 10 can include a controller 3, a heart rate (HR) calculator 4, and a skin detector 5. The controller 3 is configured to control the light transmitter 1 and the light receiver 2. The heart rate calculator 4 is configured to receive the PPG signal from the light receiver 2 and calculate a heart rate value. The skin detector 5 is configured to detect the presence of the object's skin. As an example, if the user has not properly worn the electronic device, the skin detector 5 cannot recognize the presence of the object and the heart rate calculator 4 will not operate to calculate the heart rate value for saving the power consumption. In an embodiment, the skin detector 5 and the heart rate calculator 4 operate in an interleaving manner (e.g., alternating measurements in time) for precisely monitoring the bioinformation. The communication module 6 is configured to transmit and receive electrical signals from the processor 10 to one or more other devices, and vice versa, via one or more communications protocols (e.g., WiFi, BLUETOOTH, cellular). The other circuitry 7 can be any other circuitry (e.g., charging circuitry, additional processing circuitry, memory, other sensors) equipped on the optical sensing apparatus 100.

Figure 2A:
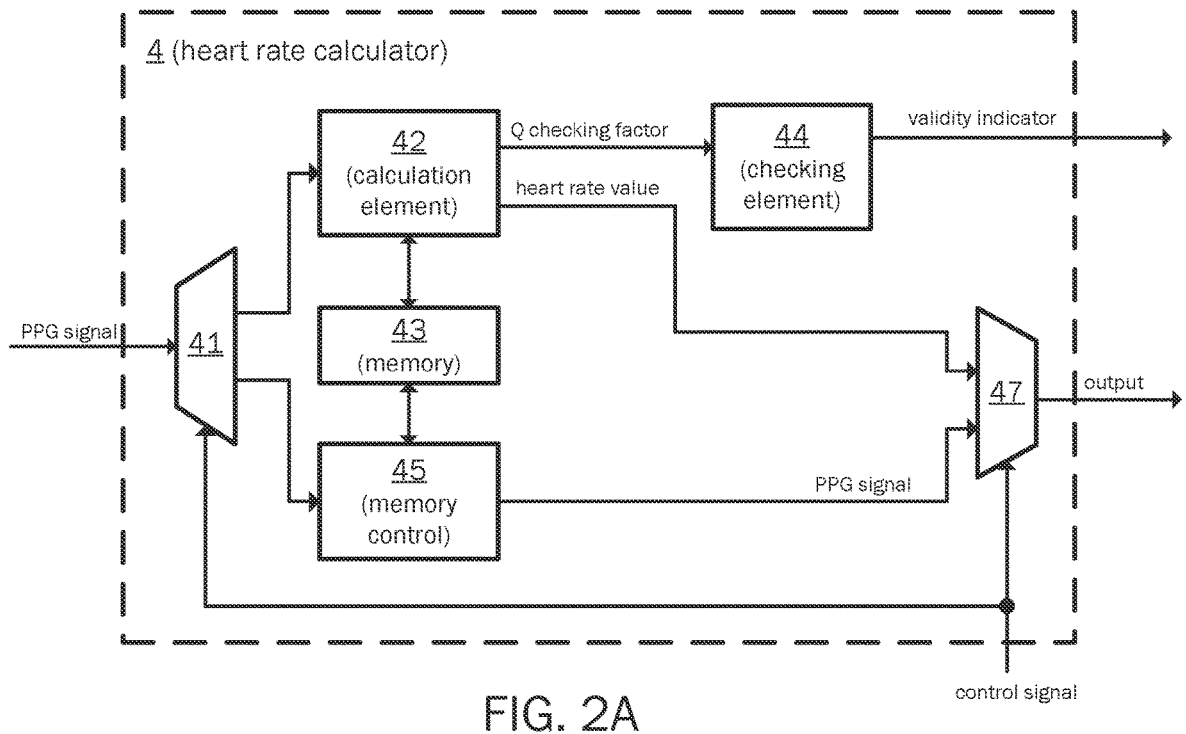
FIG. 2A illustrates a block diagram of a heart rate calculator of the optical sensing apparatus in accordance with one embodiment of the present disclosure.

FIG. 2A illustrates a block diagram of a heart rate calculator 4 of the optical sensing apparatus 100 in accordance with one embodiment of the present disclosure. The heart rate calculator 4 is configured to receive the sensing signals from the light receiver 2 and provides an output and a validity indicator to the electronic device or other computing devices, such as smartphone, watch, or computer, for further signal processing or identification. The heart rate calculator 4 is used to provide the heart rate value when the signal quality of the PPG signal is good enough. When the signal quality of the PPG signal is not good, the heart rate calculator 4 may be configured to transmit the PPG signal instead. In other words, the heart rate calculator 4 can output the heart rate or the PPG signal to the electronic device or other devices based on the validity indicator. The validity indicator can represent the quality of the PPG signal.

The heart rate calculator 4 includes a calculation element 42, a memory 43, a checking element 44, a memory control element 45 (e.g., FIFO), a demultiplexer 41, and multiplexer 47. When the skin detector 5 as shown in FIG. 1 recognizes the presence of the object's skin, the sensing signal received from the light receiver 2 can be converted as a PPG signal by the processor 10 to transmit to the calculation element 42 through the demultiplexer 41 and store in the memory 43. The calculation element 42 is configured to calculate the heart rate value by detecting the peaks of the PPG signal and calculating the interval of the peaks of the PPG signal. Furthermore, the calculation element 42 can output at least one quality checking factor (Q checking factor). The checking element 44 is configured to receive at least one quality checking factor from the calculation element 42 and determine a validity indicator to indicate the validity of the heart rate value. If the validity indicator shows valid for the heart rate value, a control signal is sent to the multiplexer 47 to control the heart rate calculator 4 to output the heart rate value through the multiplexer 47. If the validity indicator shows invalid for the heart rate value, a control signal is sent to the multiplexer 47 and the demultiplexer 41 to control the heart rate calculator 4 to output the PPG signal through the memory control element 45, the memory 43, and the multiplexer 47 for subsequent software processing. In another embodiment, when the validity indicator shows valid for the heart rate value and the user has sufficiently accurate heart rate information, a control signal also can be sent to the multiplexer 47 to control the heart rate calculator 4 to output the PPG signal for other bioinformation, such as calories, blood oxygen level (SpO$_2$), and/or blood pressure, etc. The control signal can come from a hardware (e.g., a separate controller) coupled with the validity indicator, an application-level software that is operable to issue a control signal in response to the validity indicator, or a command signal provided by a user.

The memory 43 is configured to store the PPG signal and coupled to the calculation element 42 and the memory control element 45 for providing the PPG signal to the calculation element 42 or the memory control element 45. The PPG signal can be stored in the memory 43 through the calculation element 42 or the memory control element 45. Since the calculation element 42 and the memory control element shares the memory 43, the occupied area of the heart rate calculator 4 can be reduced, and the chip size of the processor 10 can be shrunk.

In an embodiment, when the electronic device or other devices receives the validity indicator as invalid and the PPG signal from the heart rate calculator 4, the electronic device or other devices can send the related information to adjust the measurement method, such as adjusting the power of the light transmitter 1, the amplification gain of the light receiver 2, and/or providing a notification to the user to adjust the wearing position of the electronic device.

Figure 2B:
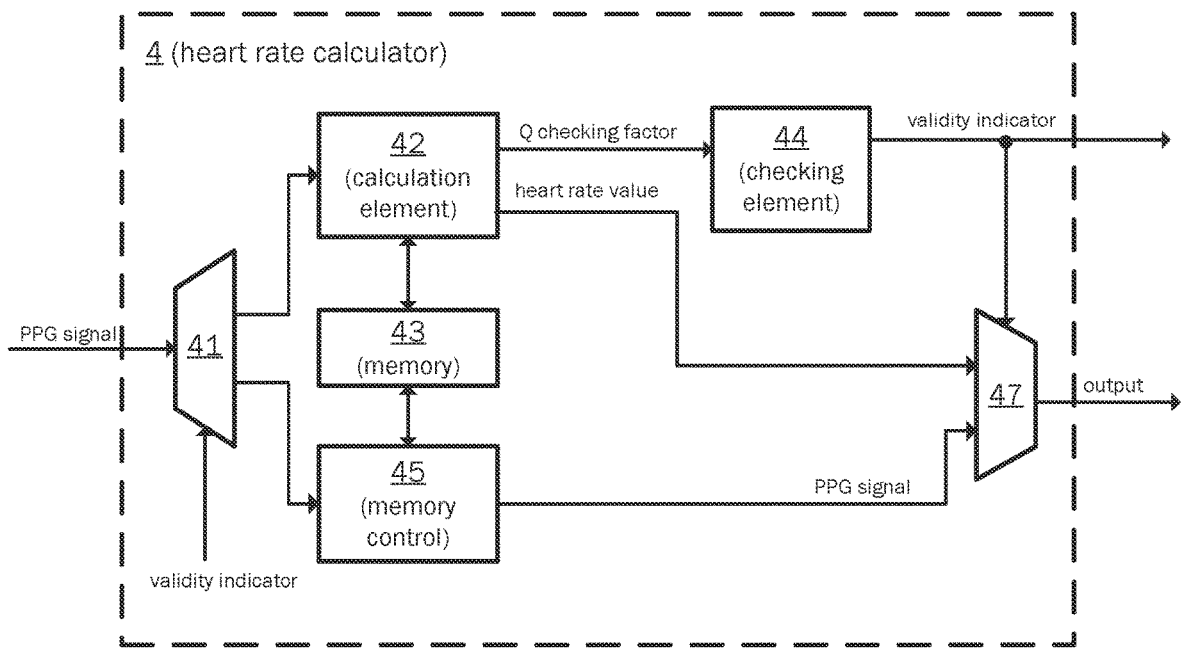
FIG. 2B illustrates a block diagram of a heart rate calculator of the optical sensing apparatus in accordance with another embodiment of the present disclosure.

FIG. 2B illustrates a block diagram of a heart rate calculator 4 of the optical sensing apparatus 100 in accordance with another embodiment of the present disclosure. The heart rate calculator 4 includes a calculation element 42, a memory 43, a checking element 44, a memory control element 45, a demultiplexer 41, and a multiplexer 47. The heart rate calculator 4 can output the heart rate value or the PPG signal based on the validity indicator. If the validity indicator shows the heart rate value is valid, the validity indicator controls the multiplexer 47 and the demultiplexer 41 to cause the heart rate calculator 4 to output the heart rate value through the multiplexer 47. If the validity indicator shows the heart rate value is invalid, the validity indicator controls the multiplexer 47 and the demultiplexer 41 to cause the heart rate calculator 4 to output the PPG signal through the memory control element 45 and the multiplexer 47.

Figure 3A:
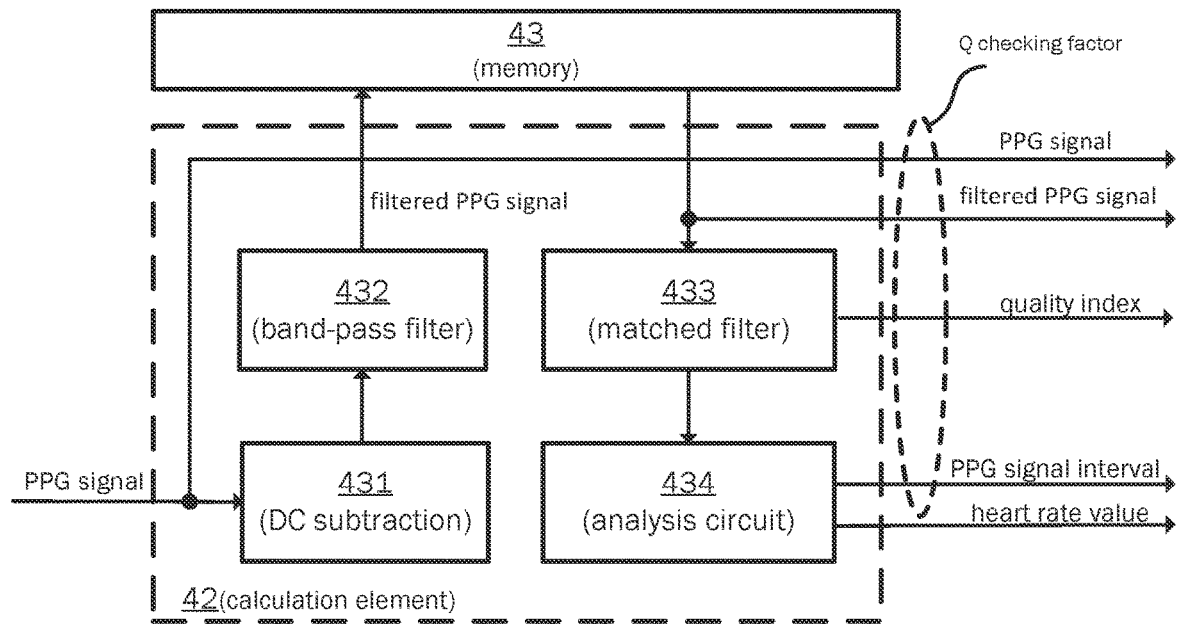
FIG. 3A illustrates a block diagram of a calculation element of the heart rate calculator in accordance with one embodiment of the present disclosure.

FIG. 3A illustrates a block diagram of a calculation element 42 of the heart rate calculator 4 in accordance with one embodiment of the present disclosure. The calculation element 42 is configured to receive the PPG signal to generate at least one Q checking factor and a heart rate value. At least one Q checking factor can include one or more of PPG signal, filtered PPG signal, quality index, and PPG signal interval. The calculation element 42 includes a DC subtraction element 431, a band-pass filter 432, a matched filter 433, and an analysis circuit 434. The DC subtraction element 431 is configured to receive the PPG signal and to output an AC signal having a DC value removed from the PPG signal. The band-pass filter 432 is configured to receive the AC signal and to output a band-passed signal having out-of-band signals removed from the AC signal. The PPG signal is inputted to the calculation element 42 and processed by the DC subtraction element 431 to remove the DC value of the PPG signal and processed by the band-pass filter 432 to eliminate unwanted out-of-band noises, such as motion artifacts and electromagnetic interferences to obtain a filtered PPG signal with higher signal-to-noise (SNR) ratio. Then, the filtered PPG signal is stored in the memory 43 and can be accessed by the calculation element 42 for subsequent processing. In another embodiment, the PPG signal is inputted to the calculation element 42 and stored in the memory 43 without being processed by the DC subtraction element 431 and the band-pass filter 432. The matched filter 433 is coupled between the memory 43 and the analysis circuit 434 for moving-averaging the periodic PPG signal based on its frequency, and is configured to determine a quality index representing the Q checking factors. The analysis circuit 434 is coupled to the matched filter 433 to generate the PPG signal interval as one of the Q checking factors and the heart rate value. The PPG signal interval can be obtained by calculating the interval of the peaks of the PPG signal.

In an embodiment, the quality index is represented as the Q checking factor to transmit to the checking element 44 for validity indicator determination. The matched filter 433 is configured to determine the quality index that represents the quality of the PPG signal. In one embodiment, the matched filter 433 is configured to calculate a mean absolute value (MAV$_{PPG}$) of the filtered PPG signal (or PPG signal) which is regarded as the quality index. The matched filter 433 has a plurality of variables (e.g., tap size) to present the ideal PPG profile of the object, and the plurality of variables can be dynamically adjusted with a feedback circuit (not shown) during processing. In addition, the matched filter 433 is also configured to attenuate the unwanted high-frequency noise of the filtered PPG signal (or PPG signal). Therefore, the analysis circuit 434 can receive a low-noise PPG signal from the matched filter 433 for subsequent processing. The analysis circuit 434 is configured to determine the heart rate value in real-time, e.g. heartbeat, by detecting peaks of the low-noise PPG signal and calculating the interval between peaks.

In an embodiment, referring to FIGS. 2A, 2B, and 3A, the checking element 44 can be configured to compare the quality index (e.g., MAV$_{PPG}$) with a reference index to determine the validity indicator. When the optical sensing apparatus 100 starts up, the light transmitter 1 is inactive and the light receiver 2 is active, a mean absolute value can be obtained through a matched filter which can be located in the calculation element 42 or the checking element 44 to present the background noise (MAV$_{noise}$). The background noise (MAV$_{noise}$) may come from the circuitry of the light receiver 2 or the package of the optical sensing apparatus. In an embodiment, the reference index can be set as C×MAV$_{noise}$, where C is an empirical constant. When the quality index (MAV$_{PPG}$) is greater than the reference index (C×MAV$_{noise}$), the checking element 44 indicates the validity indicator as valid. Otherwise, the checking element 44 indicates the validity indicator as invalid.

Figure 3B:
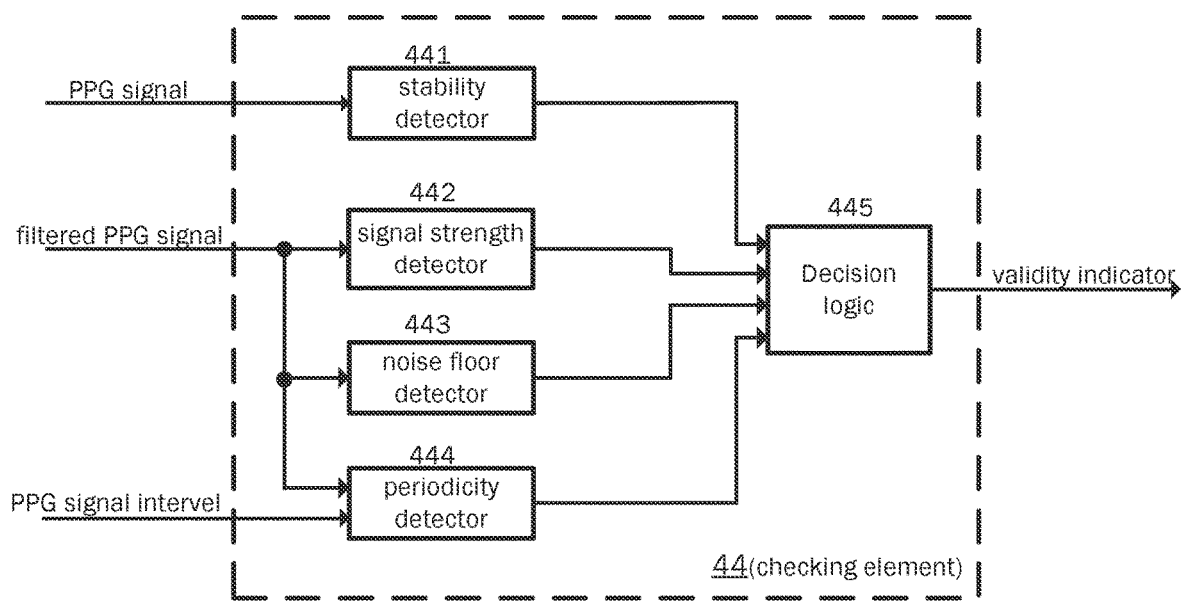
FIG. 3B illustrates a block diagram of a checking element of the heart rate calculator in accordance with one embodiment of the present disclosure.

In another embodiment, PPG signal, filtered PPG signal, and/or PPG signal interval are represented as the Q checking factors to transmit to the checking element 44 for validity indicator determination. FIG. 3B illustrates a block diagram of a checking element 44 of the heart rate calculator 4 in accordance with one embodiment of the present disclosure, where PPG signal, filtered PPG signal, and/or PPG signal interval are represented as Q checking factors. The checking element 44 may include a stability detector 441, a signal strength detector 442, a noise floor detector 443, a periodicity detector 444, and a decision logic 445. The stability detector 441 is configured to detect the stability of the PPG signal and generate a stability index based on the PPG signal. The signal strength detector 442 is configured to detect the signal strength of the PPG signal and generate a signal strength index based on the filtered PPG signal. The noise floor detector 443 is configured to detect the noise floor of the PPG signal and generate the noise floor index from the filtered PPG signal. The periodicity detector 444 is configured to detect the periodicity of the PPG signal and generate a periodicity index from the filtered PPG signal and the PPG signal interval. The decision logic 445 may then determine the validity indicator based on an evaluation of the stability index, the signal strength index, the noise floor index, and the periodicity index. In an embodiment, each index can be weighted with corresponding weighting values (predetermined or dynamically generated) for evaluation calculation. Each corresponding weighting value may be different or a part of the corresponding weighting values may be different.

Figure 4A:
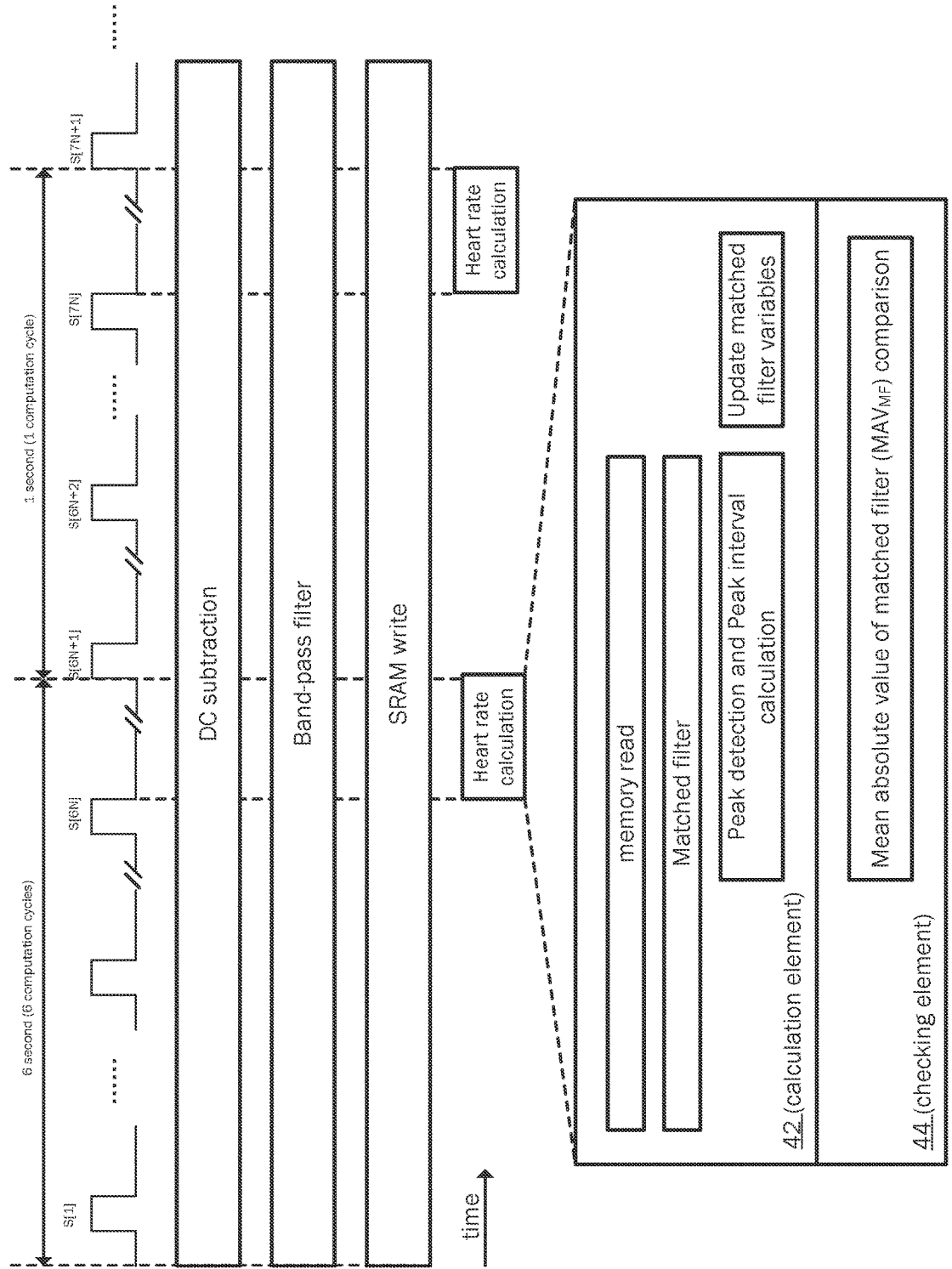
FIG. 4A illustrates a timing sequence of the heart rate calculation in accordance with one embodiment of the present disclosure.
Figure 4B:
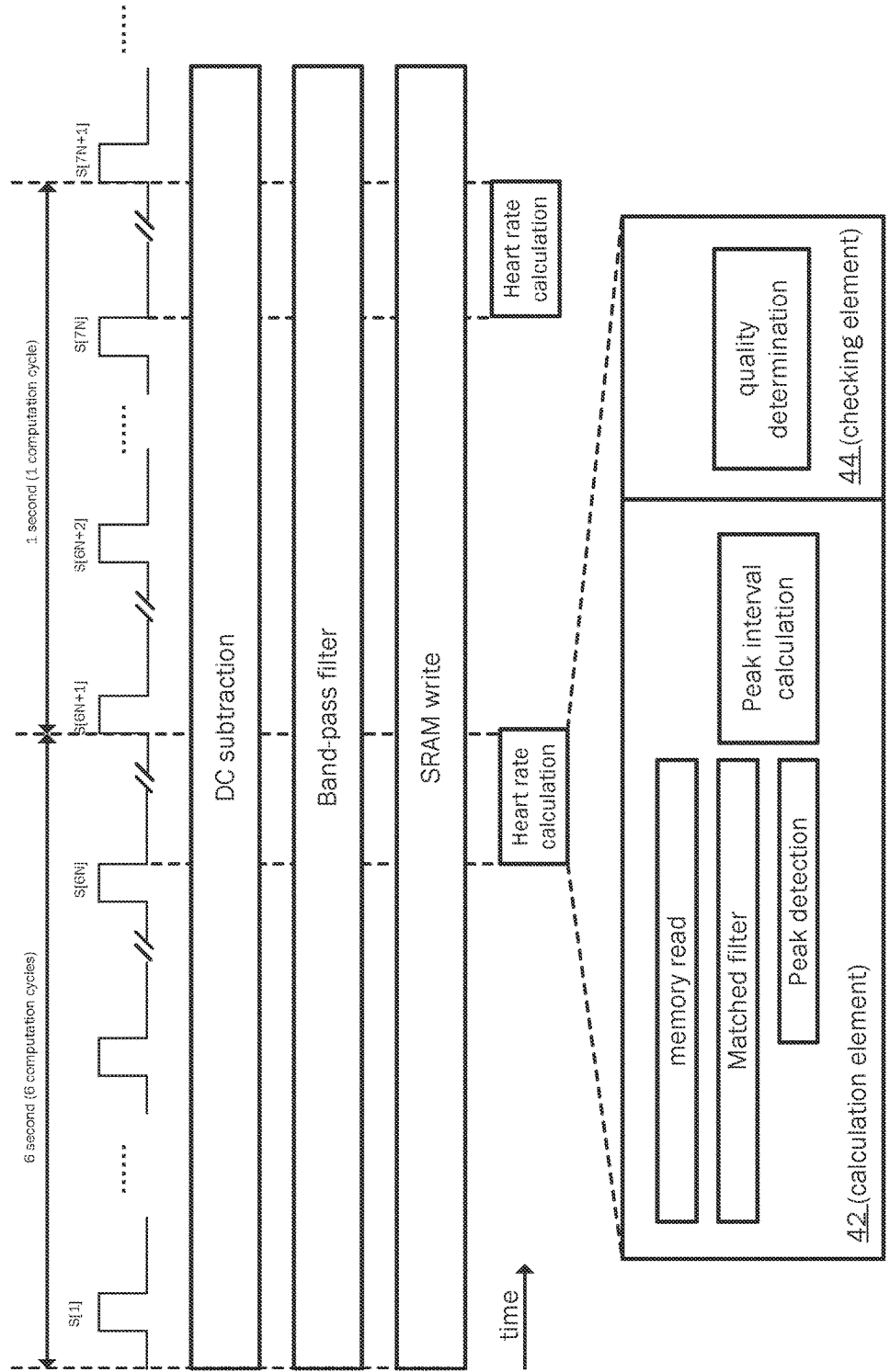
FIG. 4B illustrates a timing sequence of the heart rate calculation in accordance with another embodiment of the present disclosure.

FIG. 4A illustrates a timing sequence of the heart rate calculation, when the quality index is represented as the Q checking factor to transmit to the checking element 44 for validity indicator determination. FIG. 4B illustrates a timing sequence of the heart rate calculation, when PPG signal, filtered PPG signal, and/or PPG signal interval are represented as Q checking factors to transmit to the checking element 44 for validity indicator determination. Each heart rate calculation is performed after one computation cycle of the PPG signal, and one computation cycle has N samples. N is an integer, for example, N=50, 100, 150, and one computation cycle time can be 1 second. The first calculation requires multiple computation cycles to accumulate enough samples for matched filter processing, for example, the first calculation requires 6 computation cycles or 6 seconds. After the first calculation, the heart rate calculator can obtain an updated heart rate value every 1 computation cycle, for example, 1 second, for precise tracking.

Figure 5A:
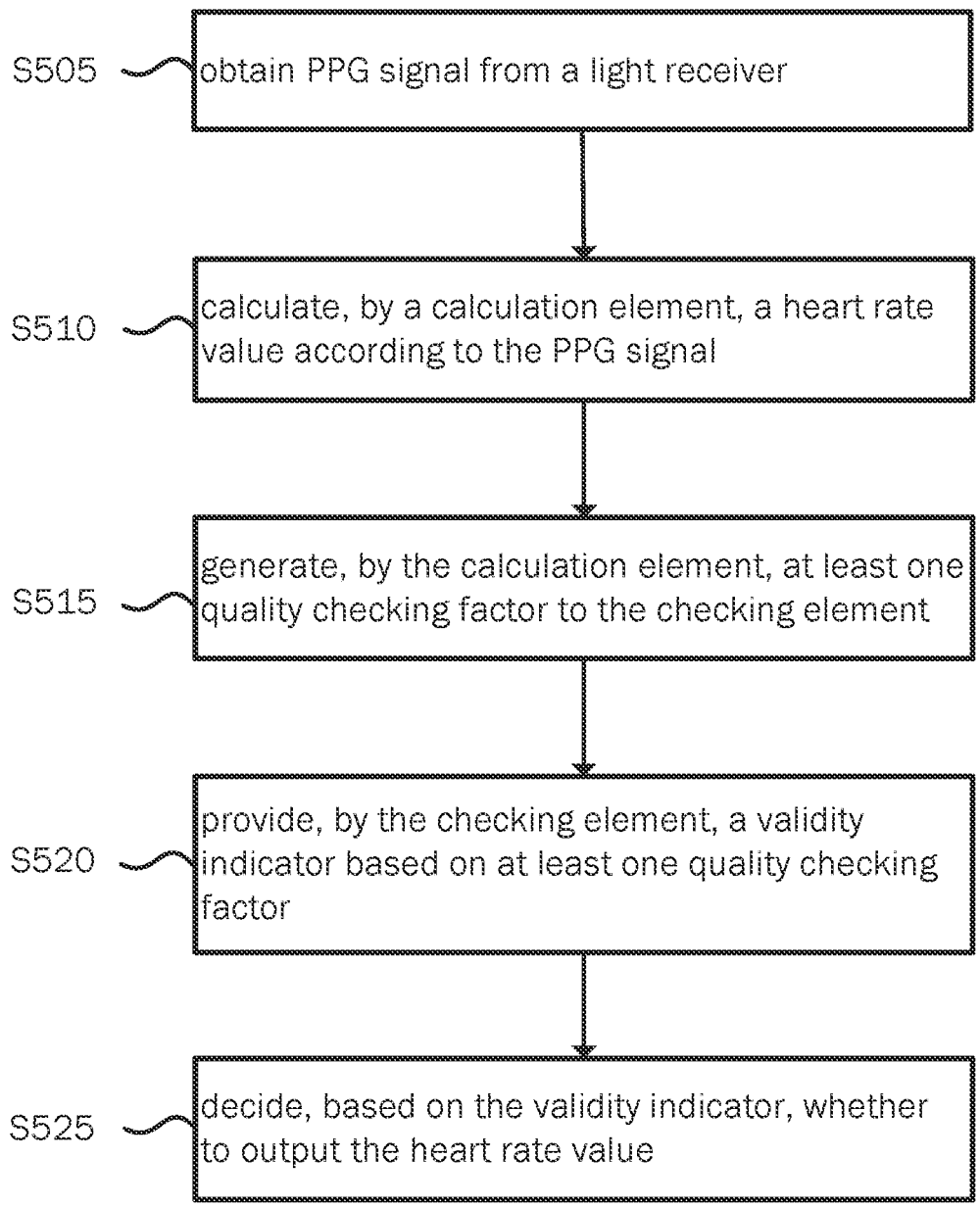
FIG. 5A illustrates a flow of the heart rate calculation in accordance with one embodiment of the present disclosure.

FIG. 5A illustrates a method 500 of the heart rate calculation in accordance with one embodiment of the present disclosure. Step S505 illustrates when the skin detector (e.g., skin detector 5 in FIG. 1) detects the presence of the object's skin, the optical sensing apparatus can obtain PPG signal from the light receiver (e.g., light receiver 2 in FIG. 1) to operate the heart rate calculation. Step S510 illustrates the calculation element of the heart rate calculator (e.g., calculation element 42 of the heart rate calculator 4 in FIGS. 2A-2B) is configured to calculate a heart rate value according to the PPG signal. Furthermore, the calculation element can also be configured to store the PPG signal in the memory for other circuits or processor access for other applications. Step S515 illustrates the calculation element of the heart rate calculator can be configured to generate at least one quality checking factor to the checking element of the heart rate calculator. Step 520 illustrates the checking element of the heart rate calculator can be configured to provide a validity indicator based on at least one quality checking factor. Step 525 illustrates the heart rate calculator can determine whether to output the heart rate value based on the validity indicator. Furthermore, the heart rate calculator can be chosen to output the PPG value based on the validity indicator.

Figure 5B:
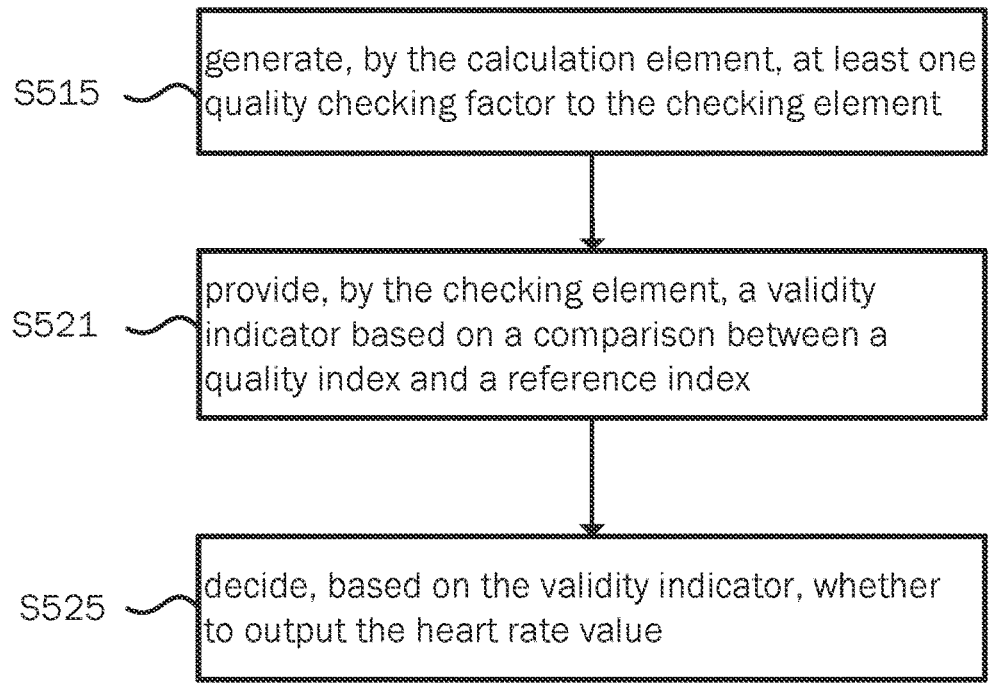
FIG. 5B illustrates a flow of the heart rate calculation in accordance with another embodiment of the present disclosure.

FIG. 5B illustrates steps S515 to S525 of the heart rate calculation in accordance with another embodiment of the present disclosure. When at least one checking factor includes the quality index as shown in FIG. 3A, the calculation element of the heart rate calculator can include a matched filter for generating a quality index according to the PPG signal. The matched filter can process the PPG signal to obtain a mean absolute value as the quality index. After step 515, step 521 illustrates the checking element of the heart rate calculator can be configured to provide a validity indicator based on a comparison between the quality index and a reference index. Then, step 525 illustrates the heart rate calculator can determine whether to output the heart rate value based on the validity indicator.

Figure 5C:
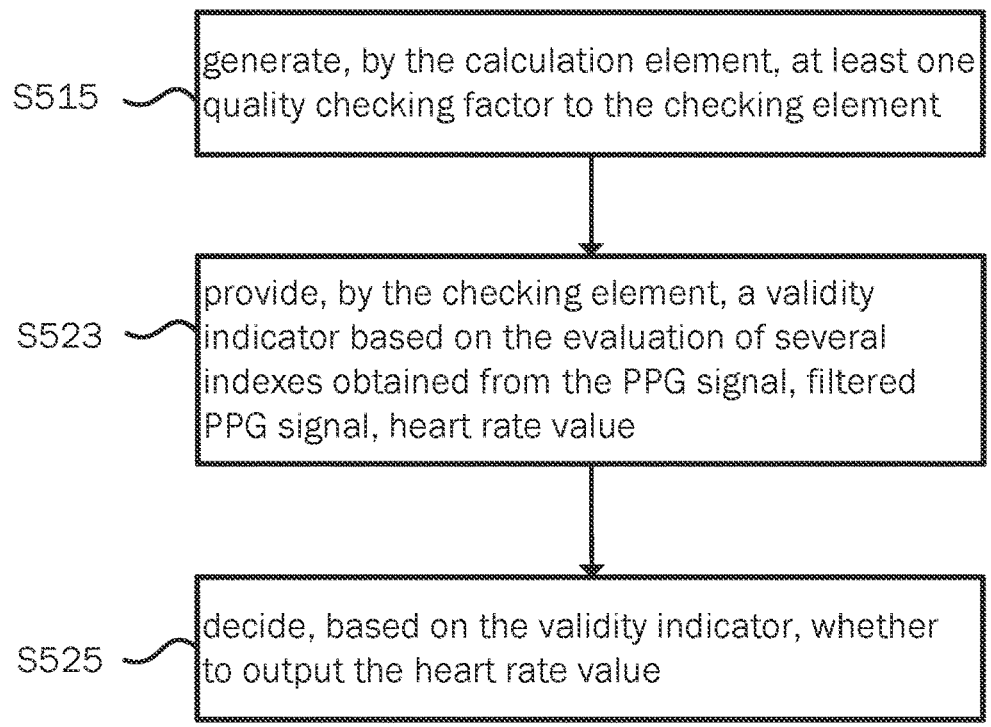
FIG. 5C illustrates a flow of the heart rate calculation in accordance with another embodiment of the present disclosure.

FIG. 5C illustrates steps S515 to S525 of the heart rate calculation in accordance with another embodiment of the present disclosure. When at least one checking factor includes PPG signal, filtered PPG signal, and heart rate value as shown in FIG. 3B. After step 515, step 523 illustrates the checking element of the heart rate calculator can be configured to provide a validity indicator based on an evaluation of several indexes which is obtained from the PPG signal, filtered PPG signal, and heart rate value. Then, step 525 illustrates the heart rate calculator can determine whether to output the heart rate value based on the validity indicator.

Figure 6:
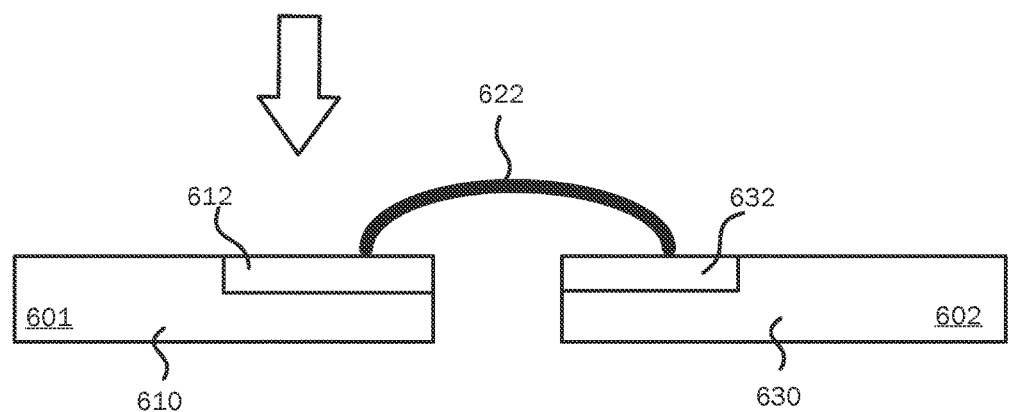
FIG. 6 illustrates an optical sensing apparatus in accordance with one embodiment of the present disclosure.

FIG. 6 illustrates an optical sensing apparatus 600 in accordance with one embodiment of the present disclosure. The optical sensing apparatus 600 includes a photodetector 601 and a control device 602 (e.g., CMOS circuitry) electrically coupled to the photodetector 601. The control device 602 can include the processor 10 as shown in FIG. 1. The photodetector 601 includes a first substrate 610 and a sensing area 612 deposited on the first substrate 610. The control device 602 includes a second substrate 630 and a circuitry area 632 (e.g., CMOS circuitry) carried by the second substrate 630. In an embodiment, the first substrate 610 and the second substrate 630 include the same material, for example, silicon substrate. In an embodiment, the photodetector 601 and the control device 602 can be disposed on a same plane of a circuit board (not shown), and the photodetector 601 is electrically coupled to the control device 602 via wire(s) 622 (e.g., wire-bonded). In another embodiment, in order to shrink the size of the optical sensing apparatus 600, the photodetector 601 can be stacked on the control device 602 and electrically coupled to the control device 602 via wire(s) or conductive glue. The sensing area 612 includes a material that can be different from (e.g., fabricated from a heterogeneous material) or the same as (e.g., fabricated from a homogeneous material) the first substrate 610. In one embodiment, the material of the sensing area 612 can include III-V material, such as P, N, Ga, In, Al. In another embodiment, the material of the sensing area 612 can include IV material such as Ge, Si.

Figure 7:
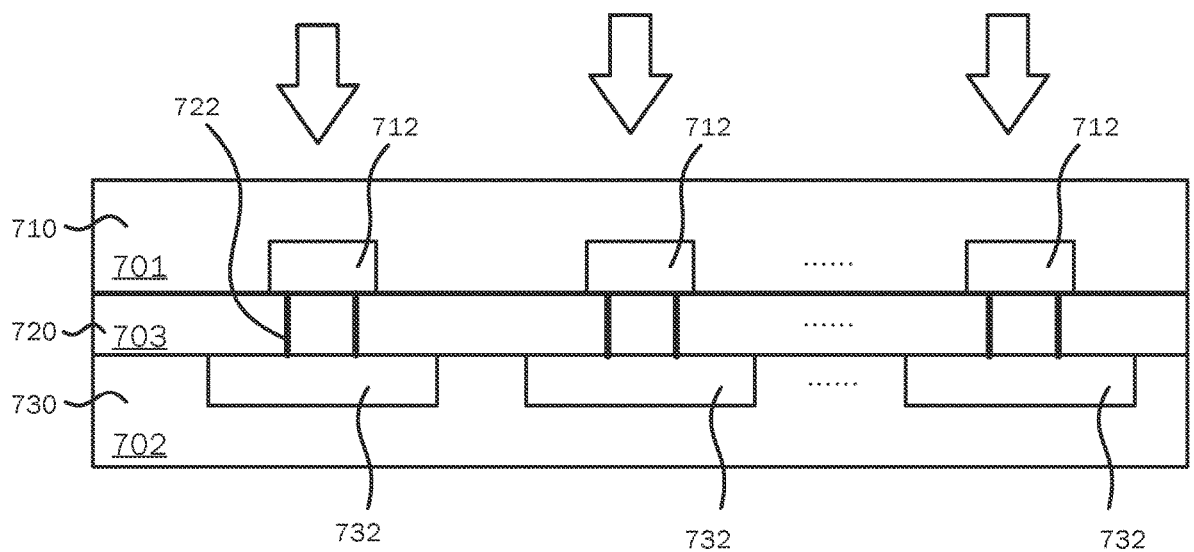
FIG. 7 illustrates an optical sensing apparatus in accordance with another embodiment of the present disclosure.

FIG. 7 illustrates an optical sensing apparatus 700 in accordance with another embodiment of the present disclosure. The optical sensing apparatus 700 includes a photodetector 701, a control device 702, and a bonding interface 703. The control device 702 can include the processor 10 as shown in FIG. 1. The photodetector 701 and the control device 702 are wafer-bonded via a bonding interface 703 (e.g., oxide or any other suitable materials). The photodetector 701 includes a first substrate 710 and a plurality of sensing areas 712 deposited on the first substrate 710. The control device 702 includes a second substrate 730 and a plurality of corresponding circuitry areas 732 carried by the second substrate 730. Each circuitry area 732 is electrically coupled to the corresponding sensing area 712 through the conductive route 722 of the bonding interface 703. The first substrate 710 and the second substrate 730 can both be silicon substrate. The sensing area 712 includes a material that can be different from (e.g., fabricated from a heterogeneous material) or the same as (e.g., fabricated from a homogeneous material) the first substrate 710. In one embodiment, the material of the sensing area 712 can include III-V material, such as P, N, Ga, In, Al. In another embodiment, the material of the sensing area 712 can include IV material such as Ge, Si.

While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded to the broadest interpretation so as to encompass all such modifications and similar arrangements and procedures.

What is claimed is:

1. An apparatus comprising a processor configured to calculate heart rate information, the processor comprising:
   a heart rate calculator configured to:
   store, by a memory of the heart rate calculator, a PPG signal;
   calculate a heart rate value and generate at least one quality checking factor according to the PPG signal;
   determine a validity indicator according to the at least one quality checking factor;
   access, by a memory control element of the heart rate calculator, the memory to transmit the PPG signal;
   provide the PPG signal accessed by the memory control element and the heart rate value to a multiplexer of the heart rate calculator; and
   output, by the multiplexer, the PPG signal accessed by the memory control element or the heart rate value according to the validity indicator.

2. The apparatus of claim 1, wherein the heart rate calculator is configured to calculate the heart rate value by detecting peaks of the PPG signal and calculating an interval between peaks.

3. The apparatus of claim 1, wherein the heart rate calculator is configured to determine, by a matched filter of the heart rate calculator, a quality index representing the at least one quality checking factor.

4. The apparatus of claim 3, wherein the quality index is determined by calculating a mean absolute value of the PPG signal.

5. The apparatus of claim 1, wherein the heart rate calculator is configured to:
   receive, by a DC subtraction element of the heart rate calculator, the PPG signal and to output an AC signal having a DC value removed from the PPG signal; and
   receive, by a band pass filter of the heart rate calculator, the AC signal and to output a band-passed signal having out-of-band signals removed from the AC signal.

6. The apparatus of claim 1, wherein the processor further comprises a skin detector configured to detect a presence of an object's skin.

7. The apparatus of claim 6, wherein the processor further comprises a controller configured to operate the skin detector and the heart rate calculator in an interleaving manner.

8. The apparatus of claim 1, further comprising:
   a light receiver comprising one or more photodetectors; and
   a control device comprising the processor.

9. The apparatus of claim 8, wherein the one or more photodetectors are formed on a first substrate wafer-bonded to the control device formed on a second substrate.

10. The apparatus of claim 9, further comprising a bonding interface between the one or more photodetectors and the processor.

11. The apparatus of claim 8, wherein the one or more photodetectors are stacked on the control device.

12. The apparatus of claim 8, wherein the processor comprises a controller configured to control the light receiver.

13. The apparatus of claim 8, wherein the one or more photodetectors comprise a plurality of sensing areas deposited on a substrate, the plurality of sensing areas are composed of a material different from the substrate.

14. The apparatus of claim 1, wherein the memory control element is configured to output the PPG signal in a first-in-first-out (FIFO) configuration.

15. A method of heart rate calculation performed by an apparatus comprising a processor, the method comprising:
   obtaining a PPG signal from a light receiver arranged in the apparatus;
   calculating, by a calculation element arranged in the processor, a heart rate value according to the PPG signal;
   generating, by the calculation element, at least one quality checking factor to a checking element arranged in the processor;
   providing, by the checking element, a validity indicator based on the at least one quality checking factor;

providing the PPG signal and the heart rate value to a multiplexer; and outputting, by the multiplexer, the heart rate value or the PPG signal based on the validity indicator.

16. The method of claim 15, further comprising detecting peaks of the PPG signal and calculating an interval between peaks to calculate the heart rate value.

17. The method of claim 15, further comprising obtaining a mean absolute value by a matched filter to generate a quality index to be the at least one quality checking factor.

18. The method of claim 15, further comprising storing the PPG signal in a memory.

19. The method of claim 15, wherein the heart rate value is obtained every one computation cycle of the PPG signal.

* * * * *